US005604938A

United States Patent [19]
Tyler

[11] Patent Number: 5,604,938
[45] Date of Patent: Feb. 25, 1997

[54] VACUUM FLUSH WASTE DISPOSAL SYSTEM FOR RAILCARS

[75] Inventor: Steven J. Tyler, Riverside, Calif.

[73] Assignee: Norcan Aircraft Corporation, Santa Ana, Calif.

[21] Appl. No.: 276,952

[22] Filed: Jul. 19, 1994

Related U.S. Application Data

[63] Continuation-in-part of Ser. No. 862,320, Apr. 2, 1992, abandoned.

[51] Int. Cl.$^6$ ........................................... E03D 11/10
[52] U.S. Cl. ..................... 4/321; 4/431; 4/434; 73/296
[58] Field of Search ................... 4/300, 316, 321, 4/323, 420, 431, 432, 433, 434, 435; 137/907; 251/30.01, 63; 73/296

[56] References Cited

U.S. PATENT DOCUMENTS

| | | | |
|---|---|---|---|
| 3,082,621 | 3/1963 | Soderholm | 73/296 X |
| 3,239,849 | 3/1966 | Liljendahl | 4/431 X |
| 3,355,139 | 11/1967 | Kittredge | 251/30.01 |
| 3,727,877 | 4/1973 | Beguiristain | 251/63 X |
| 3,811,135 | 5/1974 | Drouhard, Jr. et al. | 4/435 |
| 3,860,973 | 1/1975 | Uyeda et al. | 4/435 X |
| 3,878,569 | 4/1975 | Peirish, Jr. et al. | 4/431 X |
| 3,981,195 | 9/1976 | Forney et al. | 73/296 |
| 4,041,554 | 8/1977 | Gregory et al. | 4/420 |
| 4,214,324 | 7/1980 | Kemper et al. | 4/300 |
| 4,275,470 | 6/1981 | Badger et al. | 4/316 |
| 4,306,321 | 12/1981 | Norlin | 4/431 X |
| 4,357,719 | 11/1982 | Badger et al. | 4/316 |
| 4,376,315 | 3/1983 | Badger et al. | 4/431 |
| 4,407,160 | 10/1983 | van de Velde | 73/296 |
| 4,521,925 | 6/1985 | Chen et al. | 4/321 X |
| 4,585,207 | 4/1986 | Shelton | 251/63 X |
| 4,713,847 | 12/1987 | Oldfelt et al. | 4/316 |
| 5,271,105 | 12/1993 | Tyler | 4/431 |

Primary Examiner—Robert M. Fetsuga
Attorney, Agent, or Firm—Knobbe, Martens, Olson & Bear L.L.P.

[57] ABSTRACT

A vacuum-operated waste disposal toilet system suitable for use on commercial passenger vehicles, in particular railcars, including at least one bowl for receiving waste material and a full-retention waste-holding tank connected to the bowl by a drain line. A vacuum blower connected to the waste tank for creating a vacuum in the drain line. A flush valve assembly is provided in the drain line, and is selectively openable to connect the vacuum in the drain line to the bowl for sucking the waste out of the bowl. A disposable spray ring containing a plurality of holes, selectively coupled to a water source, is wedged between the bowl and a separate lip member for dispensing water onto the interior surface of the bowl. The flush valve assembly includes a vacuum chamber with top and bottom vacuum inlet ports, a piston connected to a valve blade movable vertically within the chamber and a flush solenoid openable to selectively connect a second vacuum to the top and bottom inlet ports. The flush solenoid in the open position opens the valve blade, which in turn opens the flush valve assembly. The assembly is supported by a novel light weight composite base having a triangulated shape. The waste-holding tank contains a plurality compression load cells on the bottom exterior surface of the tank to accurately determine the capacity level of the tank.

3 Claims, 8 Drawing Sheets

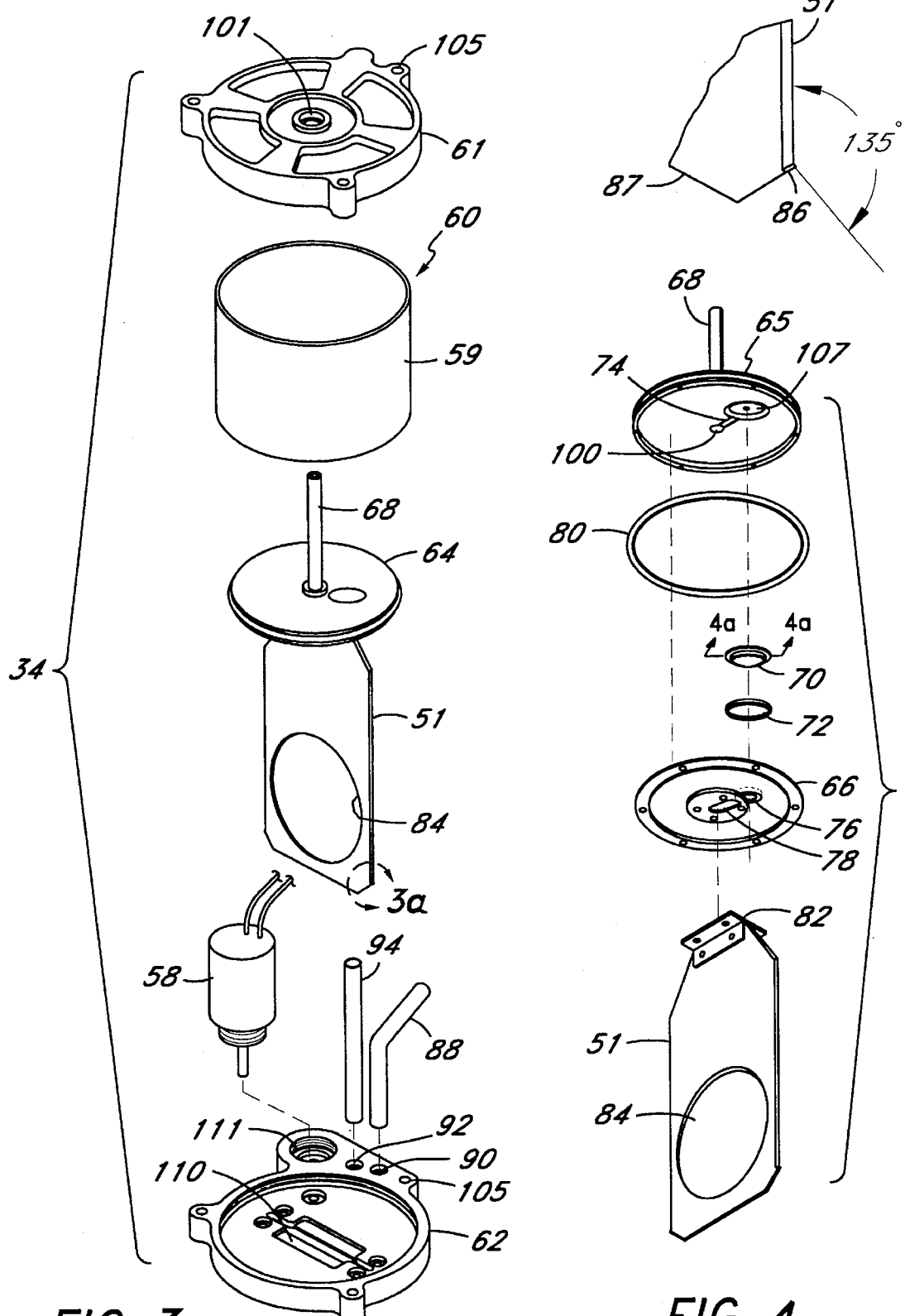

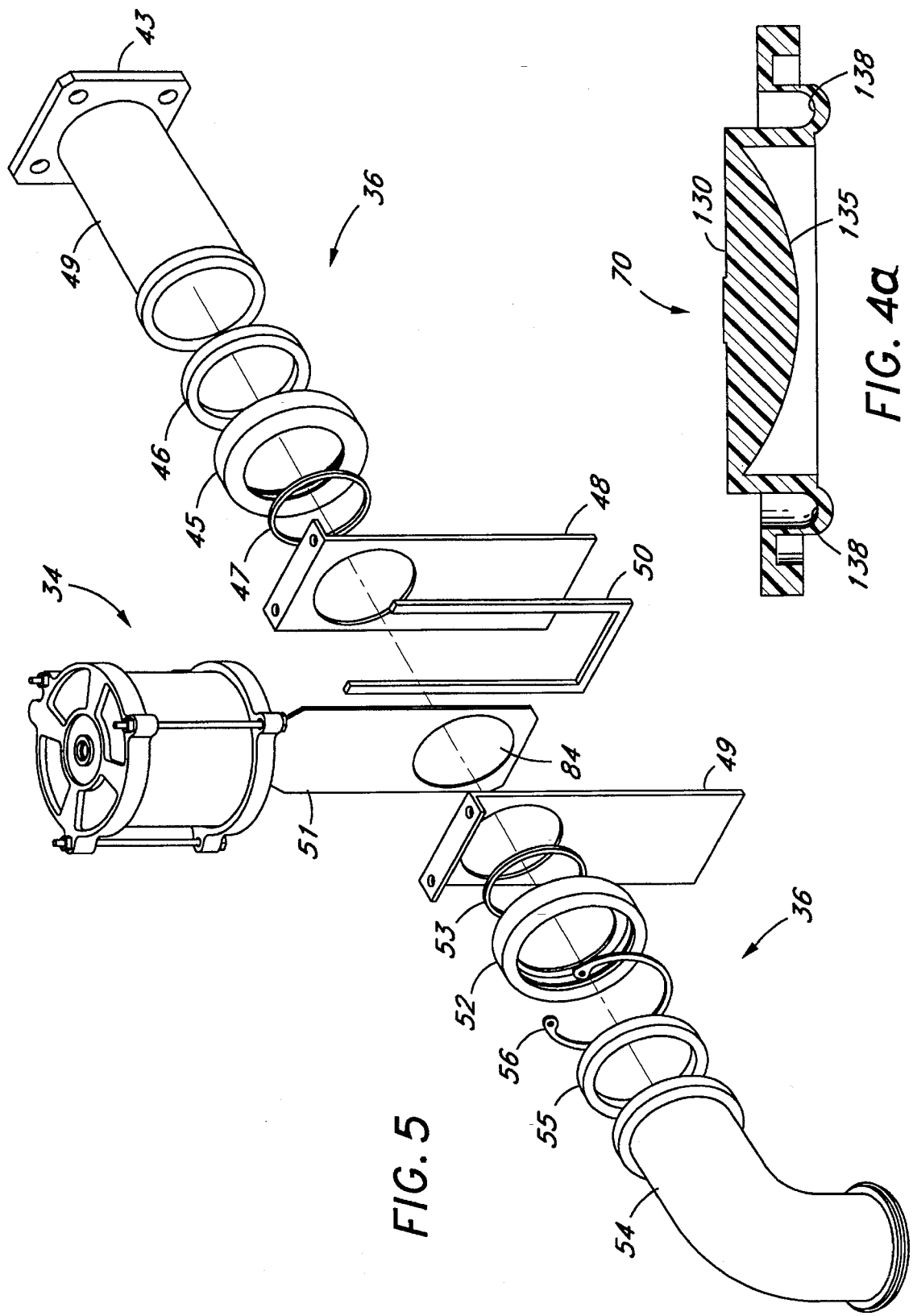

VACUUM FLUSH WASTE DISPOSAL SYSTEM FOR RAILCARS

This application is a continuation-in-part of U.S. patent application Ser. No. 07/862,320, filed Apr. 2, 1992, abandoned.

BACKGROUND OF THE INVENTION

This invention relates to vacuum operated waster disposal systems used on passenger vehicles, in particular railcars.

The main components of such a waste disposal system are a toilet assembly comprising a flush valve assembly, a toilet bowl, a spray ring, a support base, a flush control unit; and a waste tank assembly comprising a waste holding tank with compression load cells in communication with the toilet bowl through a drain line. A preferred embodiment of a toilet assembly is described and claimed in a copending-application, incorporated herein by reference, serial number (NORCAN.002A) filed on same date as the present invention and assigned to the Assignee of the present invention.

Prior art vacuum-operated waste tank assemblies for railcars are considered either recirculating, partial retention or full retention. Prior art recirculating assemblies do not contain a waste tank downstream to collect the waste. These prior art recirculating assemblies contain a number of disadvantages in that due to the lack of a waste tank, the prior art recirculating assemblies are very complex, requiring numerous pumps, valves, filtration units, and means for deodorizing and sanitizing the liquid waste used as the recirculating flushing fluid.

Prior art partial retention waste tank assemblies for railcars utilize a small partial retention waste tank which has the disadvantage of not being capable of retaining the waste material throughout the entire transit of the railcar. Once the prior art partial retention waste tank becomes filled, the waste is dumped out of the tank and into the environment during the course of the transit. These prior art partial retention waste tanks have the additional disadvantage of not being a fully enclosed system. These prior art partial retention waste tanks do not have the means to maintain a constant vacuum throughout the system even when the vacuum blower is not operative. This prevents the valve member, which selectively connects the bowl to the waste tank, from sealing the waste tank assembly from the toilet assembly. Thus, in partial retention systems, the foul odor from the waste tank is permitted to enter the lavatory.

The prior art full retention waste tank assemblies utilize a permanent waste tank capable of retaining the waste throughout the entire length of the transit. However, when prior art full retention waste tanks have been utilized, they have proven to cause a serious problem in use since they do not accurately measure waste collected in the interior of the tank. Thus, waste entering these prior art full retention waste tanks tends to explode and cake onto the outer surface of the waste level sensors. As a result, false readings or total waste level sensor failure is the result.

SUMMARY OF THE INVENTION

The preferred embodiment of waste disposal system for railcars includes a toilet bowl formed as a lightweight composite member, a disposable spray ring, a valve assembly which contains no heavy motor driven parts or gear systems, a support base formed of a lightweight composite substance, and a full retention waste tank made out of composite material.

The waste tank contains a plurality of level compression load cells located on the bottom exterior of the tank. The compression load cells measure and compare the weight of the waste tank with and without the waste material to determine the level of the waste within the tank. Since these cells are not exposed to the waste material, they operate efficiently and accurately.

The present invention utilizes a novel method of measuring the amount of waste collected in the waste tank. The location of the compression load cells on the exterior of the waste tank protects the compression load cells from the effects of waste exposure, enabling the cells to last longer and give more accurate readings.

BRIEF DESCRIPTION OF THE DRAWINGS

FIG. 3 is an exploded view of the vacuum chamber of the present invention;

FIG. 3a is an enlarged partial view of the blade of FIG. 3.

FIG. 4 is an exploded view of the piston and valve blade combination of the present invention;

FIG. 4a is an enlarged cross-sectional view of the diaphragm of FIG. 4 taken along lines 4a—4a;

FIG. 5 is an exploded view of the waste outlet tubing in relation to the valve assembly of the present invention;

DETAILED DESCRIPTION OF THE PREFERRED EMBODIMENT

Figure 1:
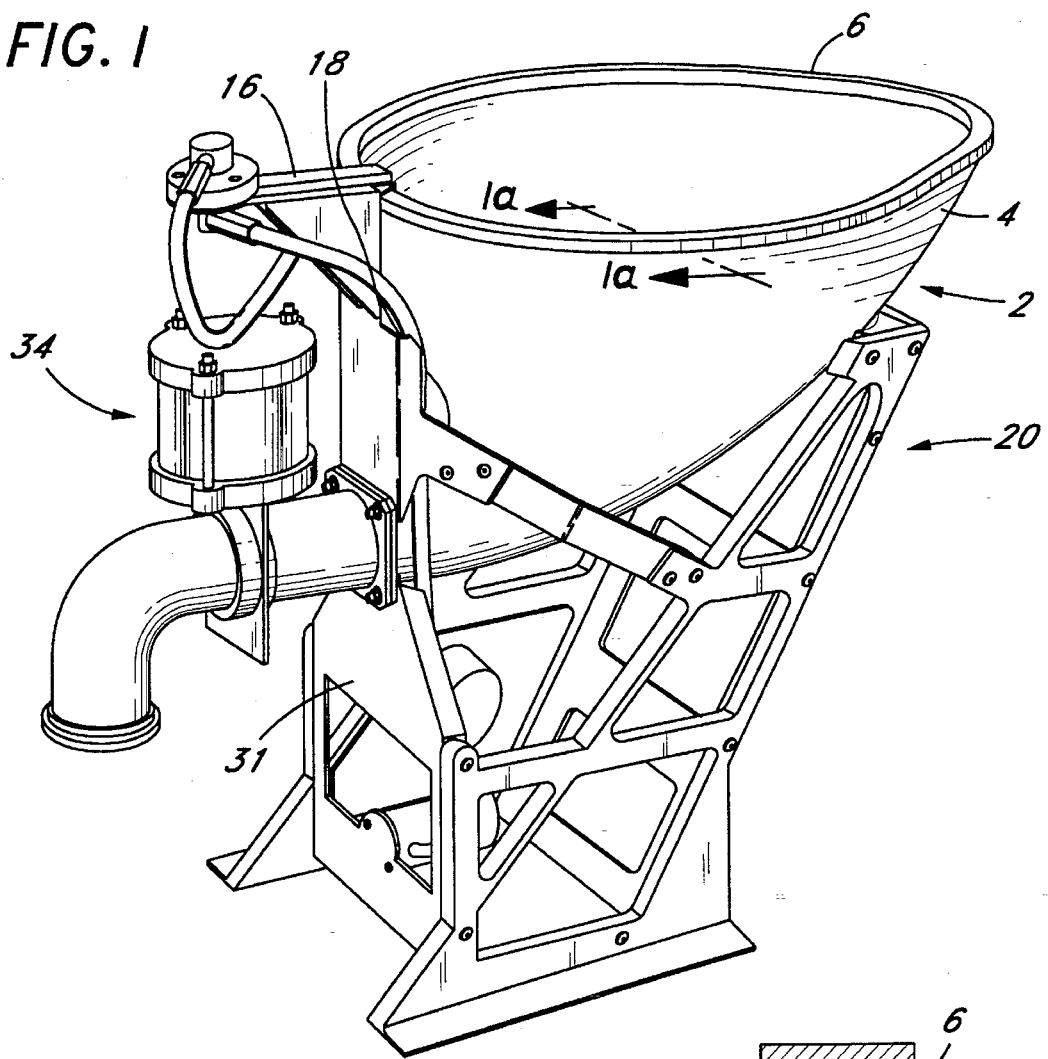
FIG. 1 is a perspective view of the toilet assembly of the present invention.
Figure 1A:
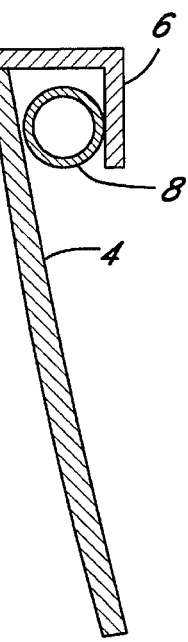
FIG. 1a is a partial cross section of the bowl taken along lines 1a—1a of FIG. 1.
Figure 1B:
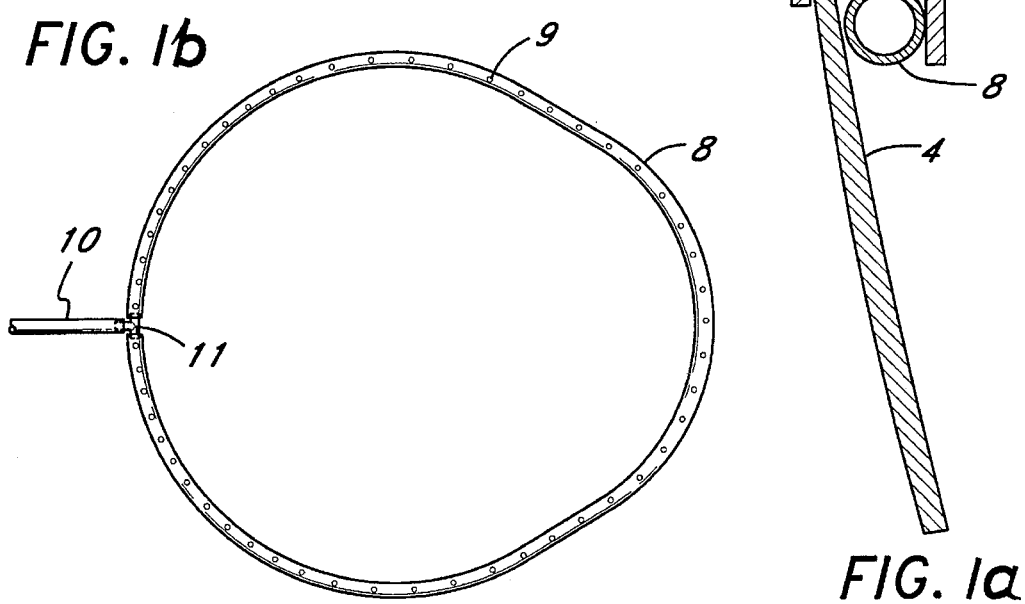
FIG. 1b is a top perspective view of the spray ring of the present invention.
Figure 1C:
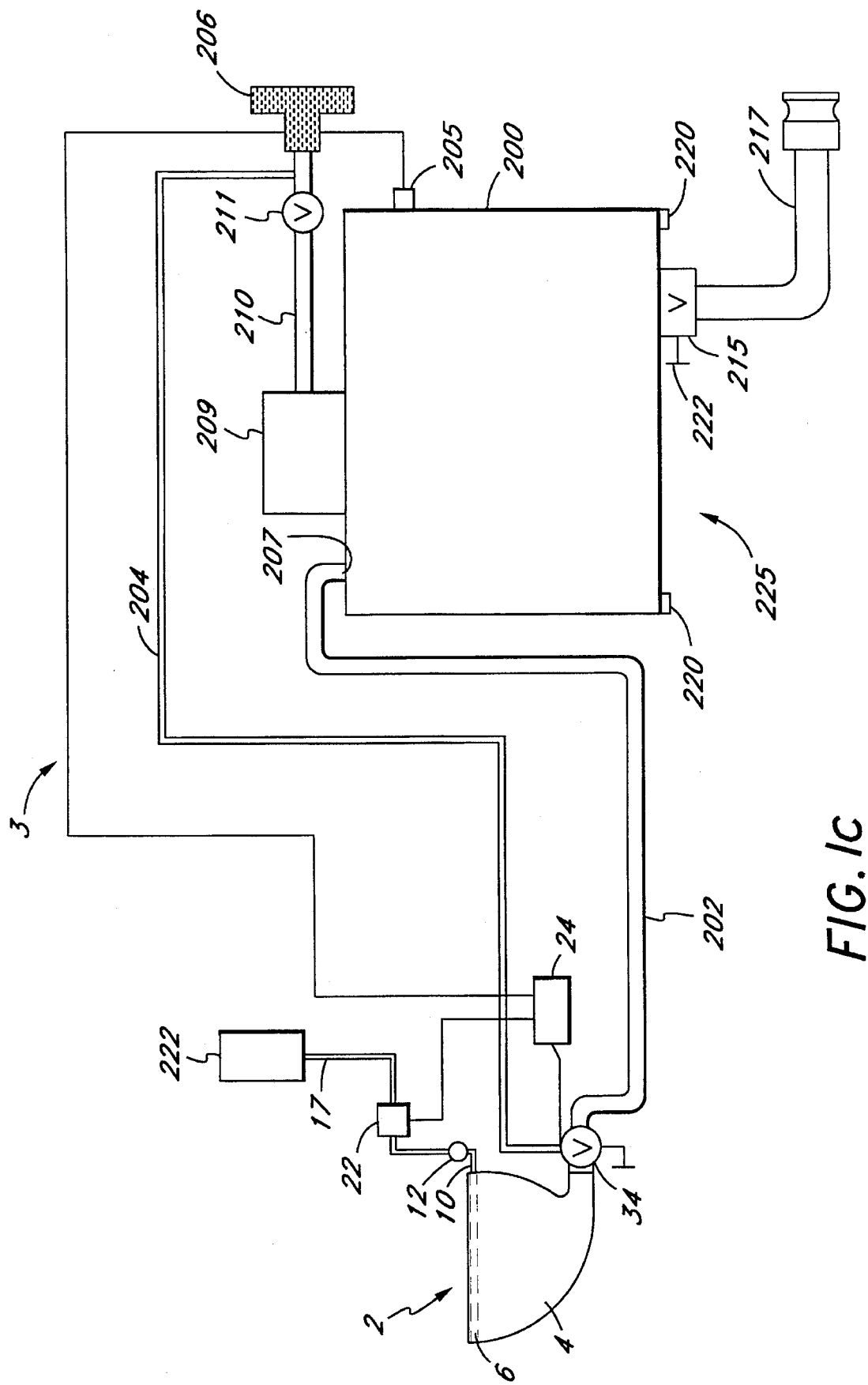
FIG. 1c is a schematic representation of the vacuum-operated waste disposal system of the present invention.

Referring to FIG. 1c, the present invention comprises a waste disposal system 3 including a toilet assembly 2 connected to a waste tank assembly 225 via a drain line 202. In the typical system, there will be one to twelve toilet assemblies 2 connected to a waste tank 200. However, for simplification, only one toilet assembly 2 will be described.

Figure 2:
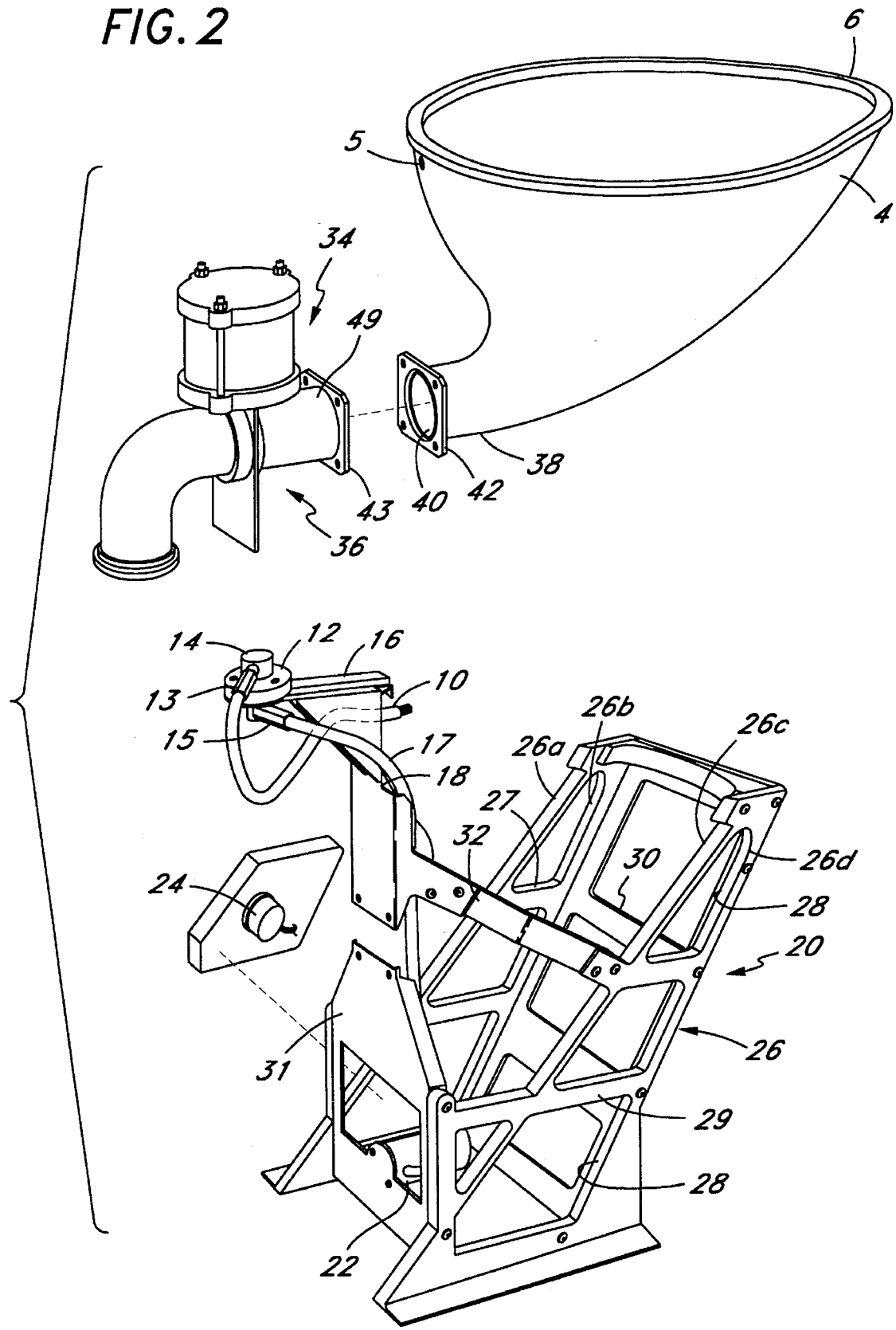
FIG. 2 is an exploded view of the toilet assembly of FIG. 1.

Referring to FIG. 1, the present invention comprises a toilet bowl assembly 2 which is light in weight and very sturdy. The assembly 2 comprises a very lightweight toilet bowl 4 advantageously constructed out of resin-impregnated fiber composite material. In the preferred embodiment, the composite material for the bowl 4 is woven fiberglass. As shown in FIG. 2, the bowl 4 has generally a funnel-like shape with a tubular bottom rear portion 38 of reduced diameter which represents the outlet for the waste contained in the bowl 4.

Referring to FIG. 1a, the top opening of the bowl 4 is connected to a separate lip or flange 6. This flange 6 will typically be made of plastic or stainless steel. The flange is placed circumferentially around the outer rim of the bowl 4 so that the flange 6 hangs over the bowl 4. In one embodiment, the bowl 4 and flange 6 are coated with a nickel-plated coating, which provides a very durable, abrasion-resistent, non-stick surface.

A disposable spray ring 8 is located between the bowl 4 and the flange 6. Ring 8 extends around the upper rim of the bowl 4 to provide an even spray pattern for bowl cleansing. Referring to FIG. 1b, in the preferred embodiment, the spray ring 8 is formed from a length of flexible plastic polyethylene tubing having two open ends with equidistantly spaced holes 9 for the emission of water onto the interior surface of the bowl 4. The tubing conforms to the shape of the rim of the bowl 4, with the two ends connected at the back of the interior of the bowl 4 to a single piece of plastic tubing 10 via a mating T-connector member 11. The spray ring 8 is simply wedged between the flange 6 and the bowl 4 for easy maintenance, as shown in FIG. 1a. The disposability of the spray ring 8 eliminates the need for frequent cleansing of the ring 8. When calcium and lime deposits form on the interior of the ring 8 from local water sources, the spray ring 8 is simply removed and disposed of and a new ring installed in its place.

Referring to FIG. 2, the back of the bowl 4 contains an opening 5 so that the tubing 10 can extend through the opening 5 and connect to a potable fresh water source 222 (shown schematically in FIG. 1c), which will supply the water necessary to cleanse the bowl 4.

The end of the tubing 10 away from the mating member 11 is connected to the output fitting 13 of an anti-siphon valve 12. The anti-siphon valve 12 only permits flow of water in one direction for sanitary purposes, so that waste water from the bowl 4 will not be able to travel from the bowl 4 back through the plastic tubing 10 and into the potable fresh water source 222 (shown schematically in FIG. 1c).

The anti-siphon valve 12 advantageously includes an anti-freeze mechanism having a return conduit. As shown in FIG. 2, the output fitting 13 is connected to a plastic top 14 of the anti-syphon valve 12 which accumulates surplus water. One end of a rectangular shaft 16 containing two channels is connected to the bottom of the anti-siphon valve 12 for providing a passage for the water that has accumulated in the top 14 of the anti-syphon valve 12 and for preventing excess water from freezing inside of the top 14. The rectangular shaft 16 lies on top of a support member 18 of the support base 20, which will be discussed later. As shown in FIG. 1, the distal end of the shaft 16 is attached to the flange 6 and overhangs the rim of the bowl 4 so that the accumulated water is returned to the bowl 4.

Referring back to FIG. 2, the input fitting 15 of the anti-siphon valve 12, is connected via tube 17 to the outlet port of a rinse solenoid valve 22, which is attached to the rear of the support base 20. The input port of the rinse solenoid valve 22 is connected to the potable fresh water source 222. The rinse solenoid valve 22 in the closed position will not allow water from the potable fresh water source 222 to enter the spray ring 8. However, the rinse solenoid valve 22 when activated to its open position, will allow water to pass through the tubing 17, the anti-syphon valve 12, the tubing 10 and finally into the spray ring 8. The rinse solenoid valve 22 is activated by a timer/electronic control module 24 discussed below.

The bowl 4 of the present invention is supported by a novel support base 20 comprising a front sheet 30, a rear sheet 31 and side members 26 as shown in FIGS. 1 and 2. The bowl 4 is cradled by the support base 20 such that the front of the bowl 4 approximately half way down from the top of the bowl 4 rests on the front sheet 30 of the base 20 while the rear 38 of the bowl 4 is secured in between the rear sheet 31 of the base 20 and the support member 18 as shown in FIG. 1.

Referring to FIG. 2, the side members 26 of the support base 20 are generally in the shape of an obtuse, scalene triangle and formed by legs 26a, 26b, 26c and 26d made out of light weight composite material. In the preferred embodiment for railcar use, the composite material for these legs is shredded glass fiber impregnated with phenolic resin or anodized aluminum. The legs 26a and 26b are connected to each other by horizontal composite bars 27, while legs 26c and 26d are connected to each other by horizontal composite bars 29. The legs 26a, 26b, 26c, 26d and composite bars 27,29 define openings 28 in the side members 26 for an additional reduction in weight. The side members 26 are connected to each other in the front and back via stainless steel sheets 30, 31 for better lateral support. The front sheet 30 contains parallelogram-like openings and is larger than the rear sheet 31. The upper portion of legs 26a and 26c are connected to support bars 32, which in turn are connected to the support member 18 where the rectangular shaft 16, which was discussed earlier, is placed.

The advantages of having this particular design for the base 20 are numerous. For instance, when a shroud (not shown) eventually encases the support base 20 for aesthetic purposes, the slanted obtuse, scalene triangular-shape of the side members 26 create more room between the support base 20 and the shroud. This extra room is especially advantageous when work needs to be done on the toilet assembly 2. In addition, the triangulated shape of the base 20 takes into account the center of gravity of the whole assembly 2 by compensating for the extra weight of the valve assembly 34 and the waste line tubing 36 (shown in FIG. 1) located behind the bowl 4. The shape of the base 20 also provides for a better distribution of the weight of the bowl 4 by making contact higher up on the bowl 4 as opposed to prior bases. Finally, the fact of having the bowl 4 cradled by the support base 20 as opposed to being hard mounted, obviates the need for heavy metal doublers.

Referring to FIG. 2, the bottom rear of the bowl 38 contains an exit opening 40 which is connected to a waste outlet tubing 36 by means of a flange attachment. The rear 38 of the bowl 4 is secured to the top of the rear sheet 31 of the base 20 and the bottom of the support member 18 via the flange attachment, as shown in FIG. 1.

Referring to FIG. 2, a first mating flange 42 is adhesively attached onto the rear 38 of the bowl 4. A second mating flange 43, welded to one end of a piece of straight outlet tubing 49, is screwed onto the first mating flange 42 with the top of the rear sheet 31 of the base 20 and the bottom of the support member 18 held in between as shown in FIG. 1.

The intended construction of the flush valve assembly 34 is shown in FIGS. 3–8. Referring to FIG. 5, the remainder of the waste outlet tubing 36 has the distal end of tube 49 welded onto a first large flange 45, which is welded over a first small flange 46. The first large flange 45 contains an interior groove in which a first spring loaded internal face seal 47 is located. This combination of a first large flange 45, a first small flange 46 and a first internal face seal 47 is welded onto a first valve body 48. The first valve body 48 is connected to a second valve body 49. A U-shaped spacer 50 is in juxtaposition with respect to the valve bodies 48, 49. The valve blade 51, which will be discussed later, is slidable in between the opening of the spacer 50.

The distal side of the second valve body 49 is connected to a second large flange 52. The second large flange 52 contains a second internal face seal 53 located within an internal groove. Both face seals 47, 53 will make flush contact with the valve blade 51 so that no air or particles can get trapped between the valve bodies 48, 49. The face seals 47, 53 utilized are a commercially standard unit containing an external circumferential groove where a continuously wound helical spring (not shown) is located. These springs are calibrated in a conventional manner by a manufacturer such as Ball Seal such that the seals 47, 53 will provide enough force onto the blade 51 to create a seal without impeding the blade's movement. The face seals provide a separate function of cleaning the surfaces of the blade 51 as the blade 51 slides up and down.

Finally, an elbow tubing 54 having one end welded onto a second small flange 55 is connected to the second big flange 52 via an internal spring ring 56. The distal end of the elbow tube 54 is connected to the drain line 202 which is eventually connected to the full retention waste tank 200 which is discussed later, as shown in FIG. 1c. These types of components allow for quick connecting and disconnecting of the flush valve assembly 34 without the use of conventional nuts and bolts. All the components utilized in the connecting of the waste outlet tubing 36 are advantageously made out of stainless steel.

Referring to FIGS. 3 and 4, the portion of the flush valve assembly 34 located on top of the waste outlet tubing 36 comprises a flush solenoid 58, a vacuum chamber 60, a piston 64, and the valve blade 51. The vacuum chamber 60 comprises a hollow cylindrical tube 59, a top cap 61 and bottom cap 62. The top and bottom caps 61, 62 are retained on the hollow tube 59 via threaded bolts extending through holes 105 and secured there by bolts (See FIG. 5).

The bottom cap 62 contains a slot 110 as shown in FIG. 3, so that the blade 51 can move freely in and out of the chamber 60. The slot 110 contains a shop-made rubber gasket (not shown) with sufficiently close tolerances to seal the vacuum within the chamber 60.

Figure 6:
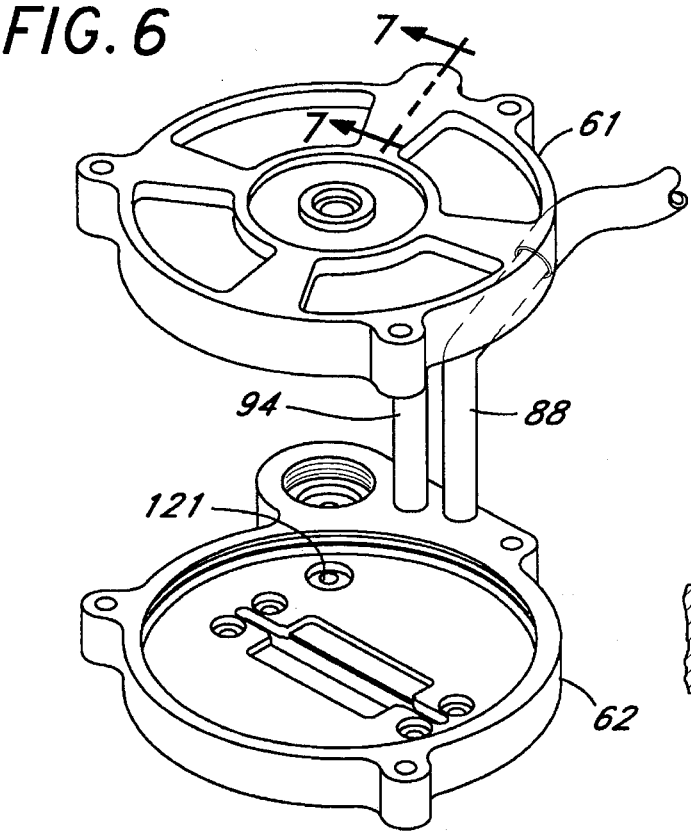
FIG. 6 is a perspective view of the top and bottom caps of the vacuum chamber of the present invention.
Figure 7:
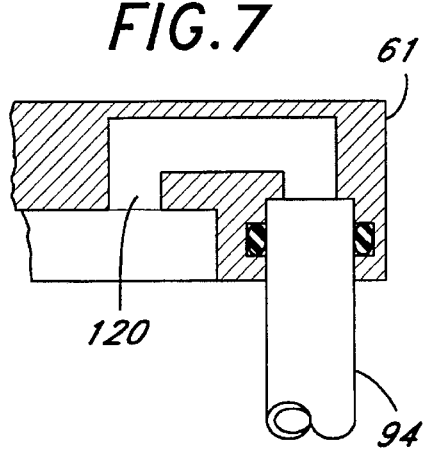
FIG. 7 is a partial cross-sectional view of the top cap taken along lines 7—7 of FIG. 6.
Figure 8:
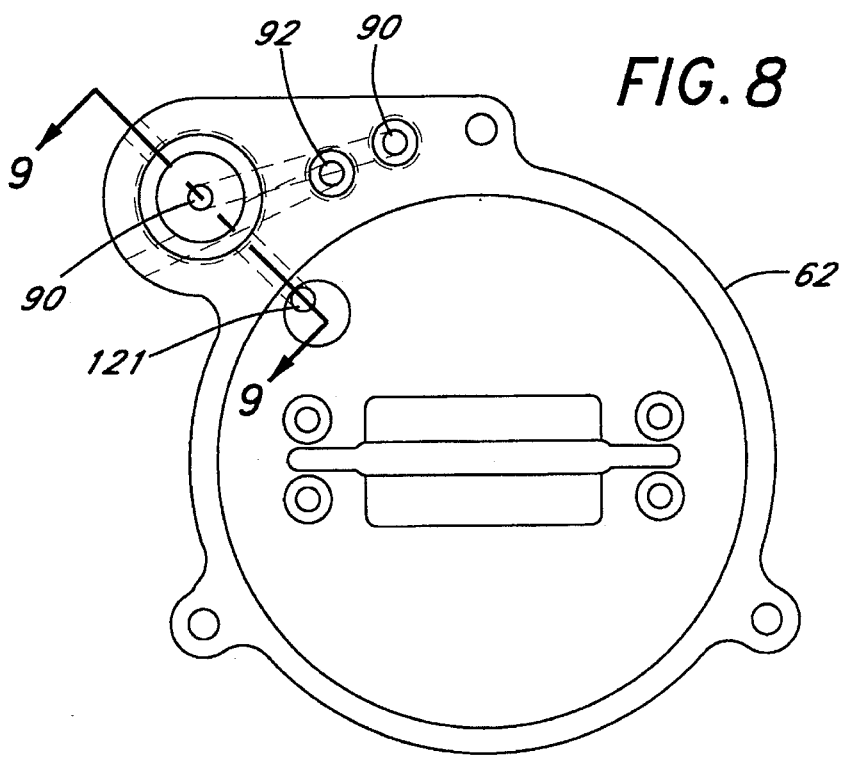
FIG. 8 is a top plan view of the bottom cap of the vacuum chamber of the present invention.
Figure 9:
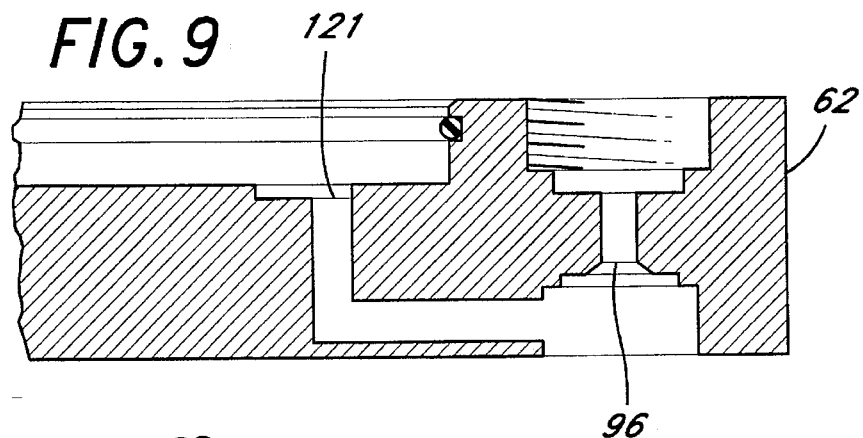
FIG. 9 is a partial cross-sectional view of the bottom cap taken along lines 9—9 of FIG. 8.

Furthermore, there are three openings located within the bottom cap 62. A first vacuum port 90 located in the bottom cap 62 is connected to a pure vacuum source via vacuum line 204 (shown in FIG. 1c) via a metal inlet tube 88 as shown in FIGS. 3 and 6. A second opening 92 located on the bottom cap 62 is linked to a vacuum port 120 shown in FIG. 7, located in the top cap 61 via a second metal tube 94 which extends from the bottom cap 62 to the top cap 61 as shown in FIGS. 3 and 7. Finally, a third opening 96 shown in FIG. 8, located in the bottom cap 62, is linked to a vacuum port 121 shown in FIG. 9, is also located in the bottom cap 62.

Referring to FIG. 1c, the vacuum connected to tube 88 via vacuum line 204 is a pure vacuum since it is connected to a vacuum blower 206 via vacuum line 204 which is not connected to the waste tank 200. The vacuum does not have to go through the waste tank 200 before entering the tube 88 (FIG. 7) so that there is no chance of fine particles of waste impeding the flow of vacuum.

The path taken by the vacuum within the flush valve assembly 34 is described with reference to FIG. 3, and 6–11. In the description, the vacuum is sometimes referred to as a positive pressure source for ease of explanation. It is understood, of course, that the actual flow of air will be in the reverse direction. When vacuum is introduced through the tube 88 from a pure vacuum line 204, the vacuum will take the following path: The vacuum will enter the first port 90 from the tube 88 and then proceed to the second opening 92. As described in more detail hereinafter with respect to FIGS. 10 and 11, depending on whether the flush solenoid 58 is open or closed, the vacuum will either (i) bypass the second opening 92 or (ii) enter it and proceed to the vacuum port 120 located in the top cap 61 (FIG. 7). If the vacuum bypasses the second opening 92, the vacuum will then pass to and through the third opening 96 and proceed to the vacuum port 121 located in the bottom cap 62 (FIGS. 8 and 9).

As shown in FIGS. 3 and 4, a plastic piston 64 in the shape of a disc is located within the interior of the chamber 60. As shown in FIG. 4, the piston 64 contains an external circumferential groove where a commercially standard spring loaded face seal 80 is contained to seal the vacuum source either above or below the piston 64 within the chamber 60.

Referring to FIG. 4, the piston 64 is made up of top and bottom circular pieces 65, 66 which are screwed together. By way of specific example, the plastic material Ulten 2000 sold by General Electric is advantageously used for the pieces 65, 66 of piston 64. The center of the top piece 65 of the piston 64 contains a hole 100 affixed to a hollow air tube 68. As shown in FIG. 3, the top cap 61 contains a centrally located hole 101, through which extends the distal end of the tube 68 in sliding engagement. This distal end is exposed to outside ambient air and as described below, this tube 68 enables an interior cavity 74 of the piston 64 to be exposed to the outside ambient air.

Referring back to FIG. 4, the interior of the top piece 65 of the piston 64 contains a recess 107 located radially outward from the hole 100 for the placement of a circular diaphragm 70 which is discussed in detail below. The diaphragm 70 is kept in the recess 107 by a retainer 72. The recess 107 is connected to the bottom hole 100 via a first recessed slot or cavity 74 located on the interior lower surface of the top piece 65 of the piston 64.

The interior upper surface of the bottom piece 66 of the piston 64 contains a second through opening 76 located adjacent to the diaphragm 70 when the top and bottom pieces 65, 66 of the piston 64 are screwed together. The center of the bottom piece 66 of the piston 64 which is in juxtaposition with the bottom hole 100, and the second opening 76 are connected via a second recessed slot 78 located on the bottom piece 66 which will create a channel or cavity within the piston 64 when mated with the first recessed slot 74 located on the interior surface of the top piece 65.

As shown in FIG. 4a, the diaphragm 70 is a flexible rubber disc having a main portion capable of moving in or out of the recess 107. The main portion of the diaphragm 70 has a substantially flat side 130 which is juxtaposed in close proximity to the recess 107 and a semi-circular opposite side 135 spaced away from the recess 107. The retainer 72 is secured to the diaphragm 709 via a circumferential groove 138 around the main portion of the diaphragm 70. The area between the main portion and the groove 138 is flexible to allow the main portion of the diaphragm 70 to either move toward or away from the recess 107. When a vacuum is created above the piston 64, the main portion of the diaphragm 70 will move toward the recess 107 and away from the second opening 76 such that the flat side 130 will be flush with ceiling of the recess 107 and the semi-circular side 135 will be distanced from the opening 76. This permits ambient air to flow through tube 68 from outside the top cap 61 to the second opening 76 and into the bottom portion of the chamber 60.

When a vacuum is created above the piston 64, the main portion of the diaphragm 70 will move away from the recess 107 and toward the opening 76 such that the flat side 130 will be distanced from the ceiling of the recess 107 and the semicircular side 135 will be flush against the opening 76. When the diaphragm 70 blocks the opening 76, ambient air cannot escape from the tube 68 and the cavity 74 to the bottom of the chamber 60 below the piston 64. Otherwise, the vacuum created beneath the piston 64 would suck the ambient air from outside the chamber 60 through the tube 68 and the opening 76. Thus, the diaphragm 70 closes off the opening 76 as discussed previously to create a suction causing the piston 64 to descend.

Referring to FIG. 4, a flexible valve blade 51 made out of stainless steel is connected to the bottom 66 of the piston 64 via a gasket 82, creating a unitary body. The piston 64 is attached substantially perpendicular to the valve blade 51. When the piston 64 rises, the blade 51 rises also.

The blade 51 contains a circular port 84 which will coincide with the interior bores of the waste line tubing 36 when the blade 51 is raised as shown in FIG. 5. The blade 51 is slidably retained within the opening of the spacer 50 as discussed earlier. The outside width of the blade 51 is less than the inside width of the spacer 50. The spacer 50 and the blade 51 have approximately the same thickness.

A significant feature of the invention is that the flush valve assembly 34 is a self-cleaning unit. Referring to FIG. 3a, the blade 51 contains notches 86 on both ends of its bottom edge 87 which automatically cleans the face seals 47, 53. As noted above, the face seals 47, 53 reciprocally clean the surface of the valve blade 51 each time the valve blade 51 is actuated.

Referring back to FIG. 3, a flush solenoid 58 is connected to the chamber 60 via an opening 111 on the bottom cap 62. In the preferred embodiment, the solenoid 58 comprises a cylindrical shell having a needle element 98 and a circular flapper valve 140, shown schematically in FIGS. 10 and 11. The solenoid 58 is actuated by the control module 24 which is discussed later.

Figure 10:
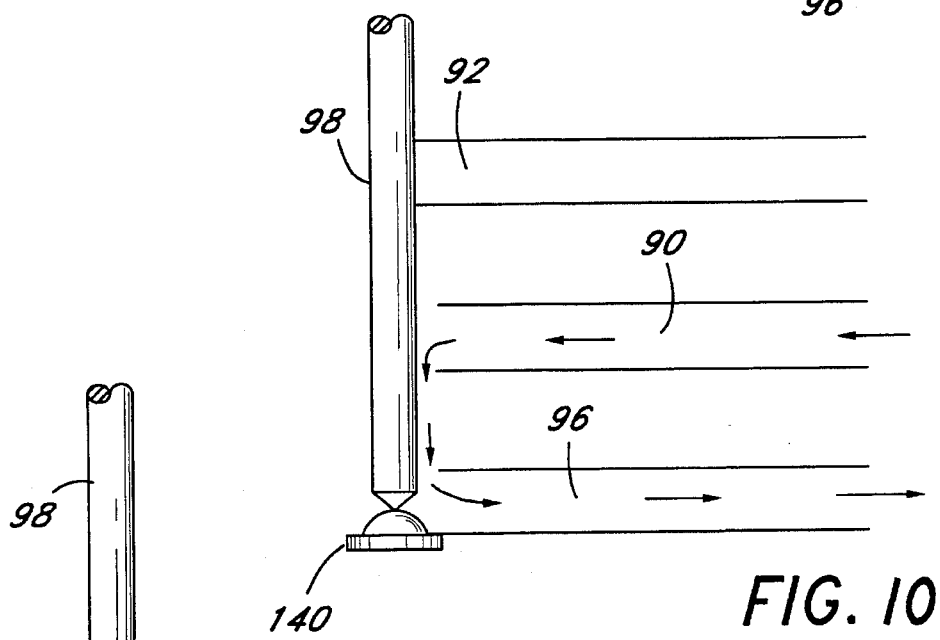
FIG. 10 is a schematic representation of the solenoid needle and flapper valve in relation to the vacuum ports when the flush solenoid of the present invention is in the closed position.
Figure 11:
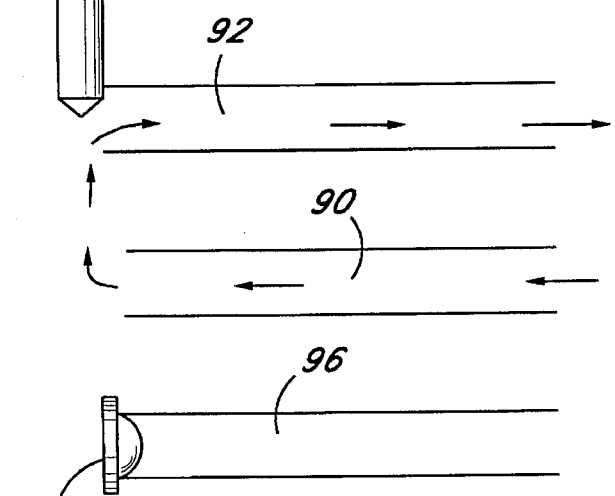
FIG. 11 is a schematic representation of the solenoid needle and flapper valve in relation to the vacuum ports, when the flush solenoid of the present invention is in the open position.

Referring to the schematic FIGS. 10 and 11, the vacuum path, in relation to the openings 90, 92, 96 located in the bottom cap 62 of the chamber 60, has been simplified. When the solenoid 58 is in the closed position as shown in FIG. 10, the solenoid needle 98 blocks off the second opening 92 so that the vacuum source of the first port 90 is connected only to the third opening 96 which will create a vacuum in the bottom of the chamber 60 through the port 121 located in the bottom cap 62. This will cause the piston 64 to either move down in the chamber 60 or, if the piston 64 is already at the bottom of the chamber 60, the piston 64 will remain so. When the solenoid 58 is in the open position as shown in FIG. 11, the needle 98 will move up causing the flapper valve 140 to pivot or tilt due to the air movement and block the third opening 96. Now the vacuum from the first port 90 is only connected to the second opening 92 which is linked to the port 120 located on the top cap 61 (FIG. 7). This will create a vacuum in the top of the chamber 60 causing the piston 64 to move upwardly.

It will thus be seen that the novel flush valve assembly 34 of the present invention is of relatively simple construction with relatively few parts. For instance, the lowering of the piston 64 to the bottom of the chamber 60 is achieved by the diaphragm and the air contained in the tube 94. Another feature of the invention is that during the descent of the piston 64, the ambient air that was contained in the tube 94 will bleed into the top portion of the chamber 60 above the piston 64, to eliminate the vacuum that was created there earlier, allowing the piston 64 to rapidly descend down in the chamber 60. Likewise, during the rise of the piston 64, the tube 68 enables the area beneath the piston 64 to fill with ambient air so that the force of the vacuum that is created above the piston 64 will not be impeded by a counteracting vacuum force located beneath the piston 64.

Referring back to FIG. 2, located in between legs 26a and 26b of the support base 20 is a timing mechanism/control module 24 of the type well known in the prior art. The timing mechanism/control module 24 establishes when the solenoids 22, 58 should open and close. The control module/ timing mechanism 24 controls the operation of the toilet assembly 2 through sequenced micro-switches.

Referring to FIG. 1c, the full retention waste tank 200 of the present invention is advantageously a cylindrical housing made out of composite material with a holding capacity of 200 gallons. The tank 200 is fabricated from a cross-linkable polyethylene material using a rotational molding process. In the preferred embodiment, the material for the tank 200 is a glass reinforced thermoplastic. This material has proven to be extremely durable and puncture resistant. The cylindrical shape of the tank 200 removes the need for internal baffling. The molding method combined with the tank shape eliminates the chances of tank failure due to a failure of weld seams. A commercially standard, flexible heating blanket (not shown) containing internal heating coils encasing the entire tank 200 (not shown) may be added to prevent freezing of the waste material. In the preferred embodiment, the waste tank 200 contains sprinklers (not shown) to selectively wash the internal sides of the tank 200 to assure proper cleaning and to prevent waste-build-up.

A pressure transducer switch 205 in the form of a commercially standard, pressure transducer switch 205 is advantageously connected to an outlet port of the tank 200. This switch 205 measures the pressure level within the tank 200 at all times so that a constant pressure is maintained throughout the system. When the pressure level sensed by the pressure transducer switch decreases below a certain level, the pressure transducer switch 205 will automatically turn on the vacuum blower 206 to maintain a constant level of vacuum. Maintaining a constant negative vacuum pressure at all times creates a faster flushing cycle due to the fact that when a flush cycle is initiated, the vacuum is already present to flush the waste. In addition, the vacuum created by the pressure transducer switch 205 will suck the valve blade 51 of the valve assembly 34 toward the face seal 53 (shown in FIG. 5) sealing this side of the interior bore of the waste outlet tubing 36 from the toilet assembly 2 so that foul odor from the waste tank 200 will not permeate the lavatory modules.

The top of the tank 200 has an inlet opening 207 wherein the drain line 202 carrying the waste enters. Attached to the top side of the waste tank 200 is a commercially standard water separator 209 used to separate air from water and waste. There is an opening (not shown) which connects the waste tank 200 to the inlet of the water separator 209. Air that is sucked out of the tank 200 by the vacuum blower 206 first passes through the water separator 209 before it reaches the blower 206. This water separator 209 prevents the flow of moisture from the waste to enter and damage the blower 206 when the blower 206 is sucking the air through the waste tank 200.

The outlet of the water separator 209 is connected to a commercially standard in-line blower check valve 211 which is a one-way check valve permitting air to flow out of the tank and preventing airflow in line 210 into the tank. The outlet of the check valve 211 is connected to the vacuum blower 206 by the same tube 210. Thus, the check valve 211 prevents ambient air from outside the system to proceed through the blower and enter the waste tank 200. Thus, when the blower 206 is turned off, this valve 211 closes and the vacuum within the system will be maintained.

The bottom side of the tank 200 contains an outlet opening connected to a waste dump valve 215 for discharging the waste after the completion of the trip. In the preferred embodiment, there is a manual release mechanism 232, well known in the industry, for manually opening the waste dump valve 215. The outlet of the waste dump valve 215 is connected to a standard tank drain tubing 217.

Referred again to FIG. 1c, the bottom exterior of the tank 200 is supported on two or more compression load cells 220 for monitoring the capacity level of the tank 200. These cells 220 are located on the exterior of the tank. Typically, the tank 200 of the present invention will have between three and five compression load cells 220 placed at advantageous locations on the bottom exterior of the tank 200 of which two such cells are shown. These cells 220 are a commercially standard unit manufactured by a company such as Transducer Technics.

Figure 12:
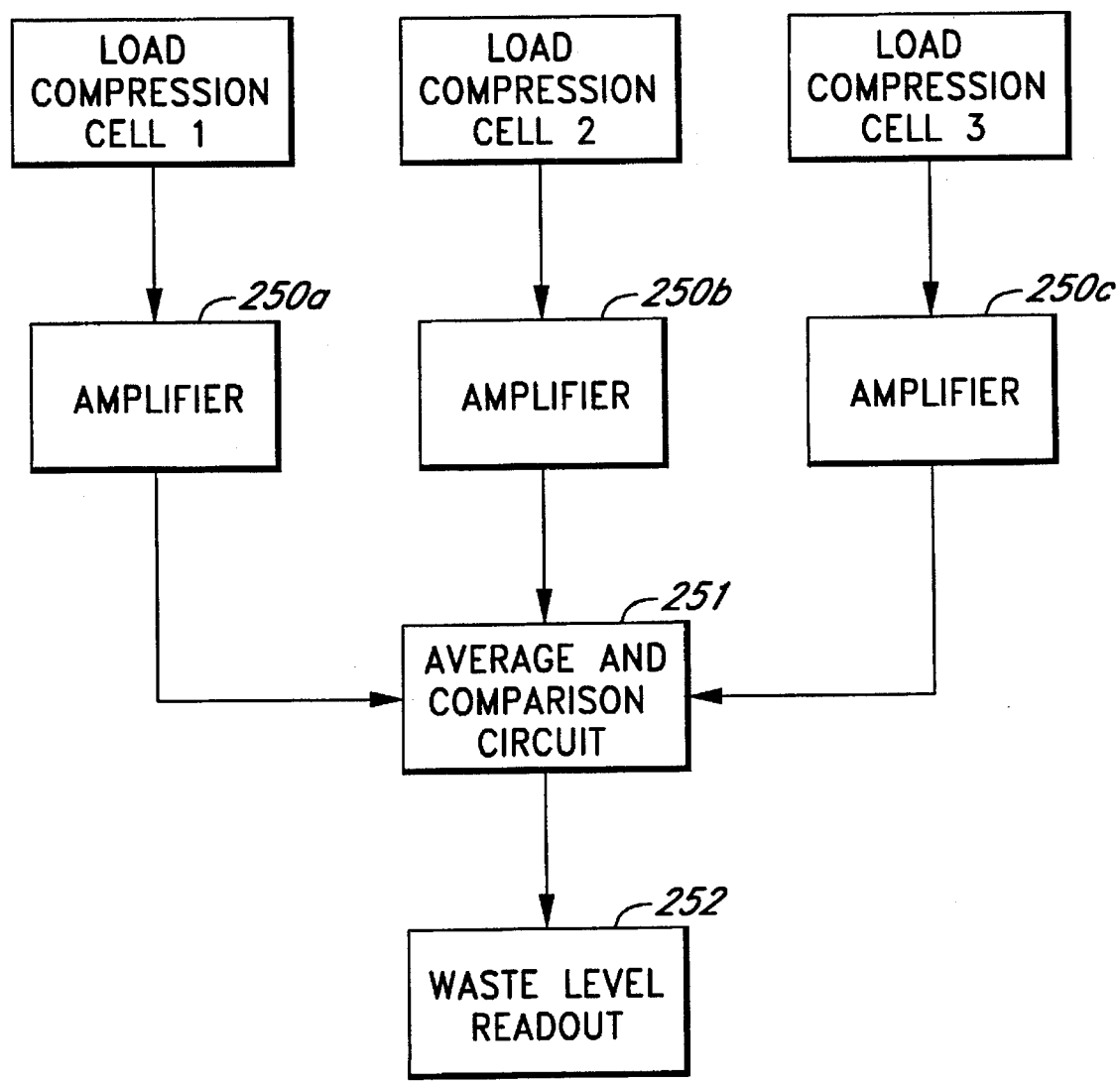
FIG. 12 is a schematic block diagram of how the waste tank level is determined.

The waste level in of the tank 200 is determined by how much the load cells 220 are compressed. Referring to the block diagram of FIG. 12, three compression load cells 220 have been shown by way of example. The individual compression load cells 220 are connected by electronic amplifiers 250a, 250b, and 250c to an average and comparison circuit 251 shown schematically in FIG. 12, which will average out the readings from the various compression load cells 220 and then compare that mean value with the weight of an empty tank 200 to determine the waste level within the tank 200. The average and comparison circuit 251 derives this value by comparing the average detected compression of the load cells 220 as compared to their average compression by an empty tank 200 and provides a readout of the waste level within the tank 200 at waste level readout 252. Readout 252 alerts the conductor of the railcar when the tank 200 is approaching full capacity.

The exterior placement of the compression load cells 220 prevent the waste material from attaching itself onto the cells 220, causing the cells 220 to either break down or give false readings.

In the preferred embodiment, the waste tank 200 is initially installed onto the railcar via a method well known in the industry, using a pallet (not shown). The pallet is a metal frame that supports and encases the bottom of the waste tank 200. The pallet is designed to be moved by forklifts or other lifting equipment. All plumbing for tank draining is advantageously attached to the pallet base. Plumbing is designed to allow tank draining from either side of the car. The lower end of the waste tank 200 is secured by known techniques, such as welding and/or bolting, to the load cells 220, which are in turn secured by known techniques such as welding and/or bolting to the pallet. The pallet is then secured, again by welding and/or bolting, to the floor of the railcar.

The full retention waste tank 200 with the externally located compression load cells 220 of the present invention presents a waste tank assembly 3, capable of accurately monitoring the operation of the system.

In operation, when the user depresses the flush button located on the lavatory module (not shown), a signal will activate the vacuum generator 206 while simultaneously initiating the toilet flush cycle. The vacuum generator 206 when turned on will reinforce the vacuum already present in the drain line 202 and in the pure vacuum line 204.

The control unit 24 of the individual toilet assembly 2 will then alert the rinse solenoid 22 to actuate into the open position. This will allow water from the potable fresh water source (222), as shown in FIG. 1c, to proceed through the plastic tubing 17, through the anti-siphon valve 12, through the plastic tubing 10, through the spray ring 8 and out onto the interior surface of the bowl 4, dispensing 12–14 ounces of water. The amount of water and the-placement of the holes 9 on the spray ring 8 should be able to fully rinse the interior surface of the bowl 4.

Then the control module 24 will alert the rinse solenoid 22 to close, thus shutting off the water supply to the bowl 4. This rinse cycle will take at most two seconds. One second after the initiation of the rinse cycle, the control module 24 will alert the flush solenoid 58 to actuate to the open position. Initially, the piston 64 will be located at the bottom of the chamber 60 due to the fact that the flush solenoid 58 is closed and that there is a constant vacuum present throughout the system even when the vacuum generator 206 is not activated due to the vacuum switch and the in-line check valve 211.

However, when the flush solenoid 58 is activated open, the needle 98 will move up, causing the flapper valve 140 to tilt and close off the third opening 96 linked to the bottom port 121 as shown in FIG. 11. The pure vacuum from the vacuum line 204 will enter the bottom cap 62 of the chamber 60 via the first port 90. The vacuum will then enter the second opening 92 linked to the second port 120 located in the top cap 61 via tube 94. This will create a vacuum in the top of the chamber 60, causing the piston 64 to rise.

As the piston 64 rises, ambient air will proceed through the tube 68 and then through the channel created by the recessed slots 74, 78, eventually bleeding off through the second opening 76 to an area below the piston 64 due to the fact that the diaphragm 70 is not blocking the-opening 76.

When the piston 64 moves up, since it is connected to the valve blade 51 via the gasket 82, the blade 51 will move up through the slot 110 of the bottom cap 62. The lift of the blade 51 will cause the port 84 on the valve blade 51 to coincide with the interior bores of the waste line tubes 36. Thus, the vacuum contained in the drain line 202 will suck the waste located in the toilet bowl 4 out to the waste tank 200. The flush solenoid 58 will remain open for approximately four seconds, allowing sufficient time for complete cleaning of the drain line 202 between the bowl 4 and tank 200.

Once the four seconds are up, the timing mechanism/control module 24 will close the flush solenoid 58. The closing of the flush solenoid 58 will cause the needle 98 to move down and block the second opening 92 linked to the port 120 in the top cap 61, as shown in FIG. 10. The flapper valve 140 will tilt back down, opening the third opening 96 which is linked to the port 121 located in the bottom cap 62. The needle 98 will eventually come to rest on told of the flapper valve 140, as shown in FIG. 10.

Now the vacuum located in thee first port 90 will be redirected to the third opening 96, which is linked to the bottom port 121, creating a vacuum below the piston 64 in the bottom of the chamber 60. This will cause the piston 64 to move down. The main portion of the diaphragm 70 during the descent will move outward from the recess 107 of the top piece 65 such that it will block the second opening 76 on the bottom piece 66. Now ambient air from the air tube 68 will not be able to enter below the piston 64. As discussed earlier, the closing of the diaphragm 70 will allow a vacuum suction to be created below the piston 64, causing the piston 64 to descend. Air that was located in the tube 94 linking the second opening 92 to the port 120 on the top cap 61 will now bleed into the area above the piston 64 in the top of the chamber 60 facilitating the descent of the piston 64 along with the air tube 68. The lowering of the piston 64 will thus lower the blade 51, moving the opening 84 of the valve blade 51 away from the interior bores of the waste line tubes 36, thus closing off the vacuum suction to the bowl 4.

The control module 24 will then send a signal to shut off the vacuum generator 206 approximately six seconds after the start of the flush cycle. The flush cycle is now complete and ready for another cycle.

The present invention discloses a novel, vacuum-operated flush waste toilet system, including a novel lightweight toilet assembly utilizing a valve assembly having relatively few moving parts. The present toilet assembly uses lightweight, yet strong composite material for many of the components of the assembly. Furthermore, the novel design of the support base provides for a more secure support of the toilet bowl. The composite materials used in this invention are substantially lighter in weight than their prior art counterparts. The reduction in the overall weight of the toilet assembly will lead to a substantial reduction in operation costs when the invention is used aboard commercial vehicles.

The present invention likewise discloses a novel apparatus and method for monitoring the waste level of a full retention waste tank utilizing compression load cells located on the exterior of the waste tank. The exterior placement of the compression load cells eliminates the chance of false readings and cell breakdown due to waste exposure.

What is claimed is:

1. A vacuum-operated flush waste disposal toilet system for railcars comprising:

a full retention composite waste holding tank;

a bowl which receives waste matter, said bowl having a top rim and an interior surface;

vacuum operated means to transfer the waste matter received in said bowl, to said tank;

a plurality of compression load cells located on a bottom exterior of said tank, said cells not coming into contact with the waste so as to give more accurate readings of the level of waste contained in said tank;

a disposable spray ring for supplying rinse water to said bowl, said spray ring having a disposable hollow tube selectively coupled to a source of water and having a plurality of openings for dispensing the water directly from said ring onto said interior surface of said bowl;

means to maintain a constant vacuum within said waste tank to provide for a rapid flush cycle;

means for averaging and comparing a value received from said cells to calculate the waste level of said tank; and a lightweight support base used to cradle said bowl, said support base comprising a front end and a back end, said ends connected by a pair of triangular, slanted, composite legs, to a front portion of said bowl about halfway down from said top rim of said bowl resting on said front end of said base, and a rear portion of said bowl being secured to said back end of said base so that said base compensates for the center of gravity of said bowl.

2. A vacuum-operated flush waste disposal toilet system for railcars comprising:

a full retention composite waste holding tank;

a bowl which receives waste matter, said bowl having a top rim and an interior surface;

vacuum operated means to transfer the waste matter received in said bowl, to said tank;

a plurality of compression load cells located on a bottom exterior of said tank, said cells not coming into contact with the waste so as to give more accurate readings of the level of waste contained in said tank;

a disposable spray ring for supplying rinse water to said bowl, said spray ring having a disposable hollow tube selectively coupled to a source of water and having a plurality of openings for dispensing the water directly from said ring onto said interior surface of said bowl;

means to maintain a constant vacuum within said waste tank to provide for a rapid flush cycle, said means connected to a vacuum source; and means for averaging and comparing a value received from said cells to calculate the waste level of said tank;

said vacuum operated means further comprising:
   a drain line connecting said bowl to said tank;
   a flush valve assembly coupled between said drain line and said bowl, and connected to said vacuum source, said flush valve assembly being selectively openable to flush said bowl, said valve assembly including:
   a valve blade movable between closed and open positions, said valve blade in the open position connecting said drain line to said bowl to suck the waste out of said bowl;
   a vacuum chamber having first and second vacuum inlet ports substantially at opposite ends of said chamber;
   a piston vertically movable within said chamber, said piston attached to said valve blade so that the movement of said piston in one direction opens said blade and the movement of said piston in the opposite direction closes said blade; and
   a flush solenoid which selectively connects said vacuum source to said first and second vacuum ports so that said vacuum source introduced at said first port causes movement of said piston in one direction and said vacuum source introduced at said second port causes movement of said piston in the opposite direction.

3. The toilet system of claim 2, wherein said piston has a diaphragm which is selectively openable so that when said flush solenoid connects said vacuum source to said first port, said diaphragm is opened, and when said flush solenoid connects said vacuum source to said second port, said diaphragm is closed, said diaphragm in the open position causing movement of said piston in one direction and said diaphragm in the closed position causing movement of said piston in the opposite direction.

\* \* \* \* \*